(12) United States Patent
Yanes et al.

(10) Patent No.: US 12,204,444 B2
(45) Date of Patent: Jan. 21, 2025

(54) INCREASED GARBAGE COLLECTION GRANULARITY FOR NON-VOLATILE MEMORY

(71) Applicant: International Business Machines Corporation, Armonk, NY (US)

(72) Inventors: Adalberto Guillermo Yanes, Sugar Land, TX (US); Timothy J. Fisher, Cypress, TX (US); Cyril Varkey, Katy, TX (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 17/684,178

(22) Filed: Mar. 1, 2022

(65) Prior Publication Data

US 2023/0281121 A1 Sep. 7, 2023

(51) Int. Cl.
*G06F 12/02* (2006.01)
(52) U.S. Cl.
CPC .................. *G06F 12/0253* (2013.01)
(58) Field of Classification Search
None
See application file for complete search history.

(56) References Cited

U.S. PATENT DOCUMENTS

| | | | |
|---|---|---|---|
| 2006/0184722 A1* | 8/2006 | Sinclair | G06F 3/0679 711/E12.008 |
| 2007/0038798 A1* | 2/2007 | Bouchard | G06F 12/06 711/3 |
| 2014/0258596 A1* | 9/2014 | Kojima | G06F 12/0246 711/103 |
| 2016/0110249 A1* | 4/2016 | Orme | G06F 11/1048 714/6.24 |
| 2016/0179678 A1* | 6/2016 | Camp | G06F 12/0855 711/103 |
| 2018/0113747 A1* | 4/2018 | Resch | G06F 11/1076 |
| 2019/0155747 A1* | 5/2019 | Sandberg | G06F 12/0292 |
| 2019/0250856 A1* | 8/2019 | Kim | G06F 3/061 |
| 2020/0151106 A1* | 5/2020 | Ahn | G06F 3/0658 |

\* cited by examiner

*Primary Examiner* — Stephanie Wu
(74) *Attorney, Agent, or Firm* — Zilka-Kotab, P.C.

(57) ABSTRACT

A computer-implemented method, according to one embodiment, is for performing garbage collection. The computer-implemented method includes: causing pages in non-volatile memory that are due for garbage collection to be inspected, and causing certain ones of the pages in the non-volatile memory having valid data therein to be identified. Each of the pages of non-volatile memory includes multiple planes, and the valid data is included in one or more of the planes in the respective identified pages. Recirculation requests, that selectively exclude planes in the identified pages that do not include any of the valid data, are further sent to a recirculation pool.

18 Claims, 9 Drawing Sheets

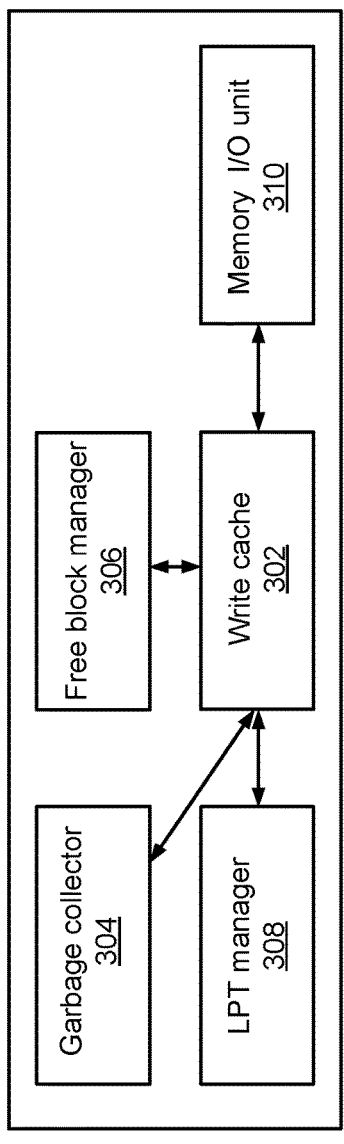
FIG. 3
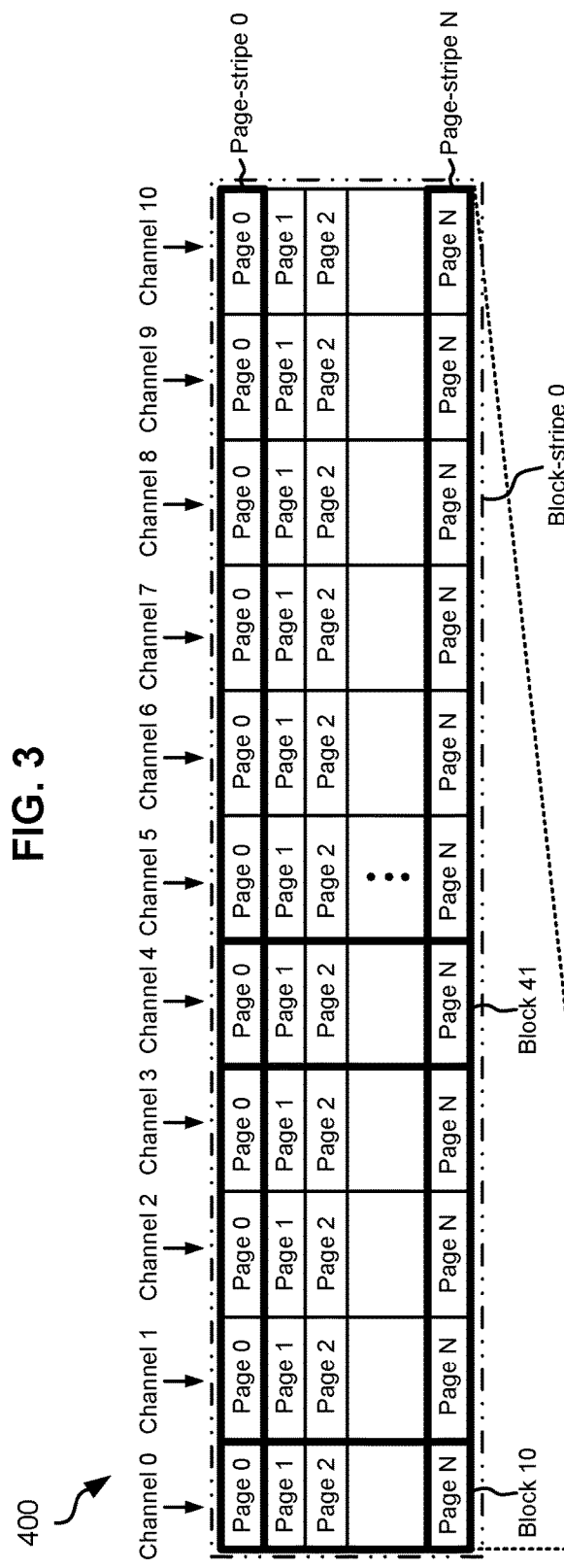
FIG. 4
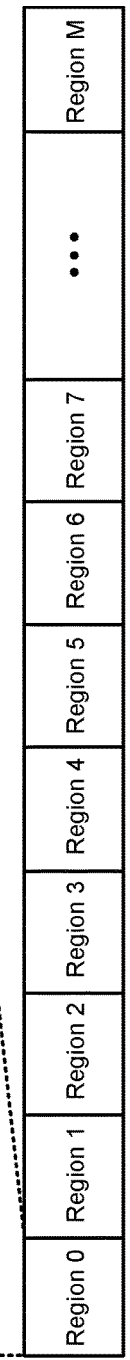

INCREASED GARBAGE COLLECTION GRANULARITY FOR NON-VOLATILE MEMORY

BACKGROUND

The present invention relates to data storage, and more particularly, this invention relates to performing garbage collection in memory.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in sections prior to being written to. Before erasing though, a section undergoes garbage collection, whereby any valid data in the section is relocated to a new section. Garbage collection of a section is typically deferred for as long as possible to maximize the amount of invalidated data in the section, and thus reduce the number of valid pages that are relocated, as relocating data causes additional write operations, and thereby increases write amplification.

Memory such as Flash-based SSDs also has a higher cost associated therewith in comparison to sequential access memory. As a result, storage capacity in Flash-based SSDs implementations is typically limited and operations involving larger amounts of data create performance bottlenecks. Similarly, data that has been recalled to such memory to perform an operation may not be used again for a substantial amount of time, thereby polluting the Flash-based SSDs by restricting use of valuable storage capacity until the data itself is reused or forced out.

It follows that conventional implementations of Flash-based SSDs and the management of data therein have suffered from inefficiencies stemming from the foregoing issues. These inefficiencies have also had negative effects on performance of the overarching storage systems as a whole.

SUMMARY

A computer-implemented method, according to one embodiment, is for performing garbage collection. The computer-implemented method includes: causing pages in non-volatile memory that are due for garbage collection to be inspected, and causing certain ones of the pages in the non-volatile memory having valid data therein to be identified. Each of the pages of non-volatile memory includes multiple planes, and the valid data is included in one or more of the planes in the respective identified pages. Recirculation requests, that selectively exclude planes in the identified pages that do not include any of the valid data, are further sent to a recirculation pool.

A computer program product, according to another embodiment, is for performing garbage collection. The computer program product includes: one or more computer readable storage media, and program instructions collectively stored on the one or more computer readable storage media. Moreover, the program instructions include: program instructions to perform the foregoing method.

A system, according to yet another embodiment, includes: a plurality of non-volatile memory blocks configured to store data, a processing circuit, logic integrated with and/or executable by the processing circuit. Moreover, the logic is configured to: cause pages in the non-volatile memory that are due for garbage collection to be inspected, and cause certain ones of the pages in the non-volatile memory having valid data therein to be identified. Each of the pages includes multiple planes, and the valid data is included in one or more of the planes in the respective identified pages. Furthermore, in response to determining that a temporal delay is currently applied to recirculation requests sent to a write cache, recirculation requests are sent to the write cache in response to the temporal delay being fulfilled. It should also be noted that the recirculation requests do not include planes in the identified pages that do not include any of the valid data.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
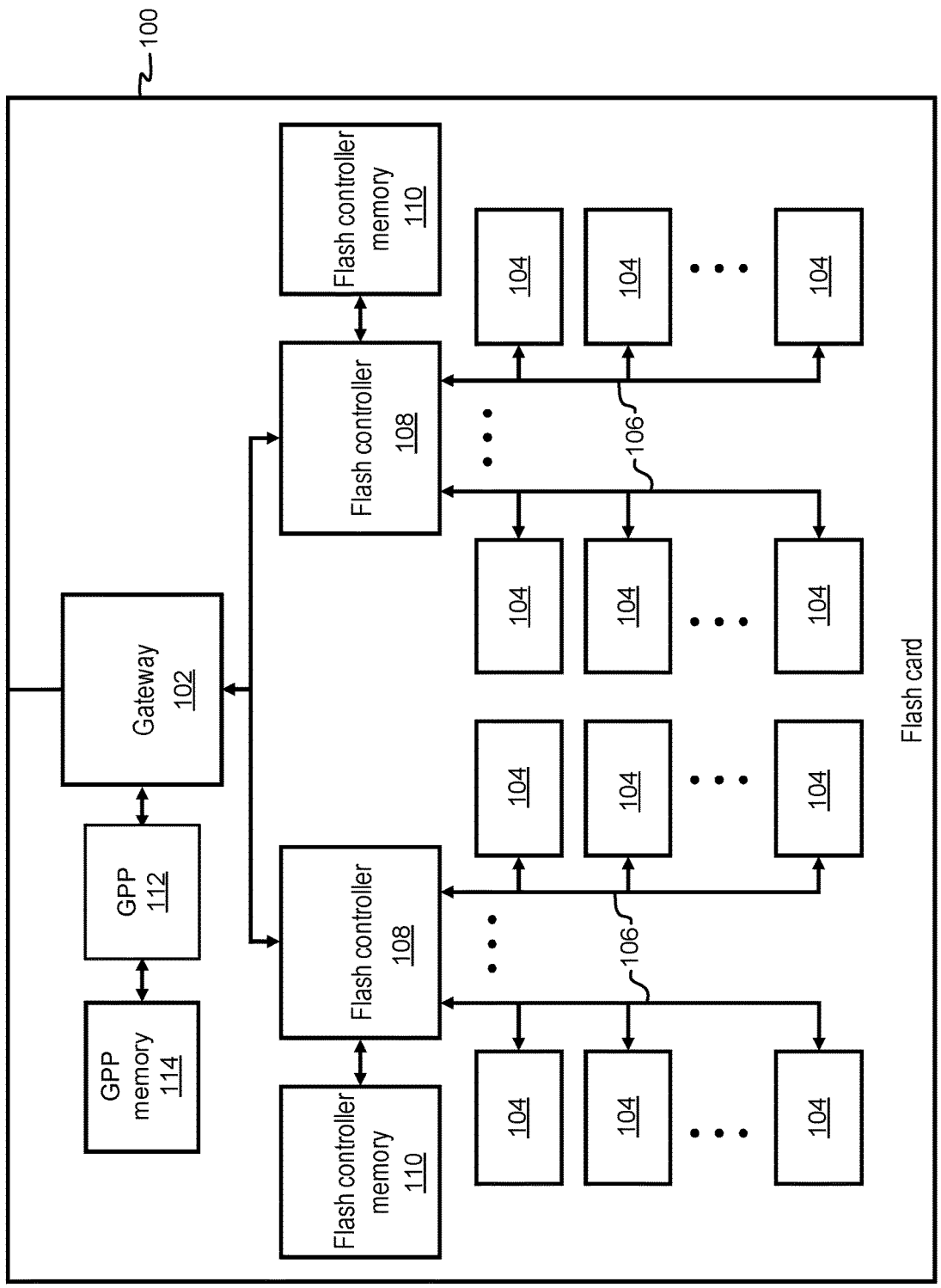
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is for performing garbage collection. The computer-implemented method includes: causing pages in non-volatile memory that are due for garbage collection to be inspected, and causing certain ones of the pages in the non-volatile memory having valid data therein to be identified. Each of the pages of non-volatile memory includes multiple planes, and the valid data is included in one or more of the planes in the respective identified pages. Recirculation requests, that selectively exclude planes in the identified pages that do not include any of the valid data, are further sent to a recirculation pool.

In another general embodiment, a computer program product is for performing garbage collection. The computer program product includes: one or more computer readable storage media, and program instructions collectively stored on the one or more computer readable storage media. Moreover, the program instructions include: program instructions to perform the foregoing method.

In yet another general embodiment, a system includes: a plurality of non-volatile memory blocks configured to store data, a processing circuit, logic integrated with and/or executable by the processing circuit. Moreover, the logic is configured to: cause pages in the non-volatile memory that are due for garbage collection to be inspected, and cause certain ones of the pages in the non-volatile memory having valid data therein to be identified. Each of the pages includes multiple planes, and the valid data is included in one or more of the planes in the respective identified pages. Furthermore, in response to determining that a temporal delay is currently applied to recirculation requests sent to a write cache, recirculation requests are sent to the write cache in response to the temporal delay being fulfilled. It should also be noted that the recirculation requests do not include planes in the identified pages that do not include any of the valid data.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed dynamic RAM (DRAM), phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
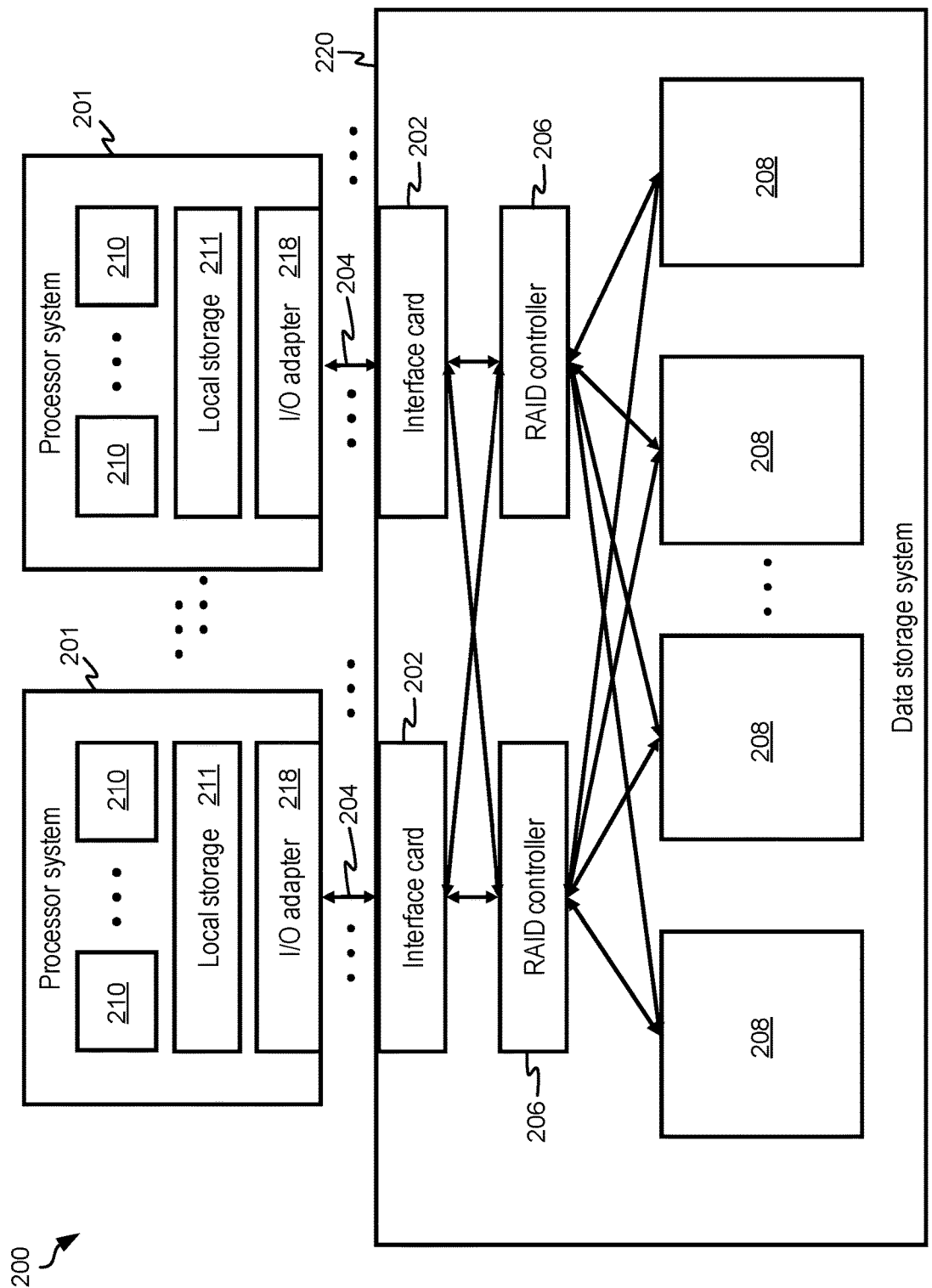
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCOE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 814 of FIG. 8, ROM 816 of FIG. 8, etc.), and an I/O adapter 218 configured to communicate with the data storage system 220.

Referring again to FIG. 1, memory controllers 108, GPP 112, and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying a particular section of memory to be reclaimed for future usage and relocating all data that is still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 and/or GPP 112 of FIG. 1) may internally perform a garbage collection. As previously mentioned, the garbage collection may include selecting a LEB to be relocated, after which all data that is still valid on the selected LEB may be relocated, e.g., as will be described in further detail below. After the still valid data has been relocated, the LEB may be erased and thereafter, used for storing new data. The amount of data relocated from the garbage collected LEB determines the write amplification. Moreover, an efficient way to reduce the write amplification includes implementing heat separation.

Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat separation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat separation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat separation is two-fold. First, performing a garbage collection process on a hot memory block will prevent triggering the relocation of cold data as well. In the absence of heat separation, updates to hot data, which are performed frequently, also results in the undesirable relocations of all cold data collocated on the same LEB as the hot data being relocated. Therefore, the write amplification incurred by performing garbage collection is much lower for embodiments implementing heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB or 16KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated regions labeled "Region 0" through "Region M". An aggregated region consists of all physical regions with the same region index on different channels. It should be noted that aggregated regions are also referred to herein simply as regions.

When implemented with data stored in non-volatile memory, each physical region on a channel may include a large set of blocks, e.g., typically in the order of 1024, 2048 or more. Moreover, one or more physical regions may also include several additional blocks which may be used as replacement blocks for bad blocks (e.g., blocks performing poorly, blocks having undesirable characteristics, etc.).

In each region of non-volatile memory, a single block from each channel may form a respective block-stripe. It follows that a number of block-stripes supported by a given embodiment of non-volatile memory may be determined by the number of blocks per region and the number of regions.

In the exploded view of Region 0, the conceptual diagram 400 further illustrates a single block-stripe (Block-stripe 0) out of the set of block-stripes supported in the remainder of the regions. Block-stripe 0 of Region 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Region 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Region 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Region 0 constitute Block-stripe 0. While all blocks in a block-stripe typically belong to the same aggregated region, in some embodiments one or more blocks of a block-stripe may belong to different physical regions. It follows that each aggregated region may include one or more block-stripe. Thus, according to an illustrative embodiment, Block 0 through Block 10 from different physical regions may constitute a block-stripe.

Regardless of whether the conceptual diagram 400 of FIG. 4 is implemented with non-volatile memory and/or a cache architecture, in different embodiments, the number of pages in each block and/or the number of channels in each region may vary depending on the desired embodiment. According to an exemplary embodiment, which is in no way intended to limit the invention, a block may include 256 pages, but could include more or fewer in various embodiments. Analogously, the number of channels per region and/or the number of regions may vary depending on the desired embodiment. Similarly, each page may include a number of planes therein. For instance, although not depicted in FIG. 4, a given page of memory may include 4 separate planes therein, each of the planes being able to store a similar amount of data.

Referring still to FIG. 4, all pages in a block-stripe with the same page index denote a page-stripe. For example, Page-stripe 0 includes the first page (Page 0) of each channel in Block-stripe 0 of Region 0. Similarly, Page-stripe N includes the last page (Page N) of each channel in Block-stripe 0 of Region 0.

As previously mentioned, locations in memory such as Flash-based SSDs are erased in sections prior to being written to. Before erasing though, a section (e.g., block) undergoes garbage collection, whereby any valid data in the section being erased is relocated to a new section. Garbage collection of a section is typically deferred for as long as possible to maximize the amount of invalidated data in the section, and thus reduce the amount of valid data that is relocated, as relocating valid data causes additional write operations, and thereby increases write amplification.

However, it is hugely impractical to wait for an entire section of memory to be void of any valid data before erasing it to minimize write amplification stemming from valid data relocation writes. Conventional relocation processes themselves have also been plagued by inefficiencies caused by invalid data and/or empty memory locations being processed for relocation in addition to the valid data.

In sharp contrast to these conventional shortcomings, various ones of the approaches included herein have significantly improved both the efficiency and throughput of the garbage collection process, e.g., as will be described in further detail below.

Figure 5:
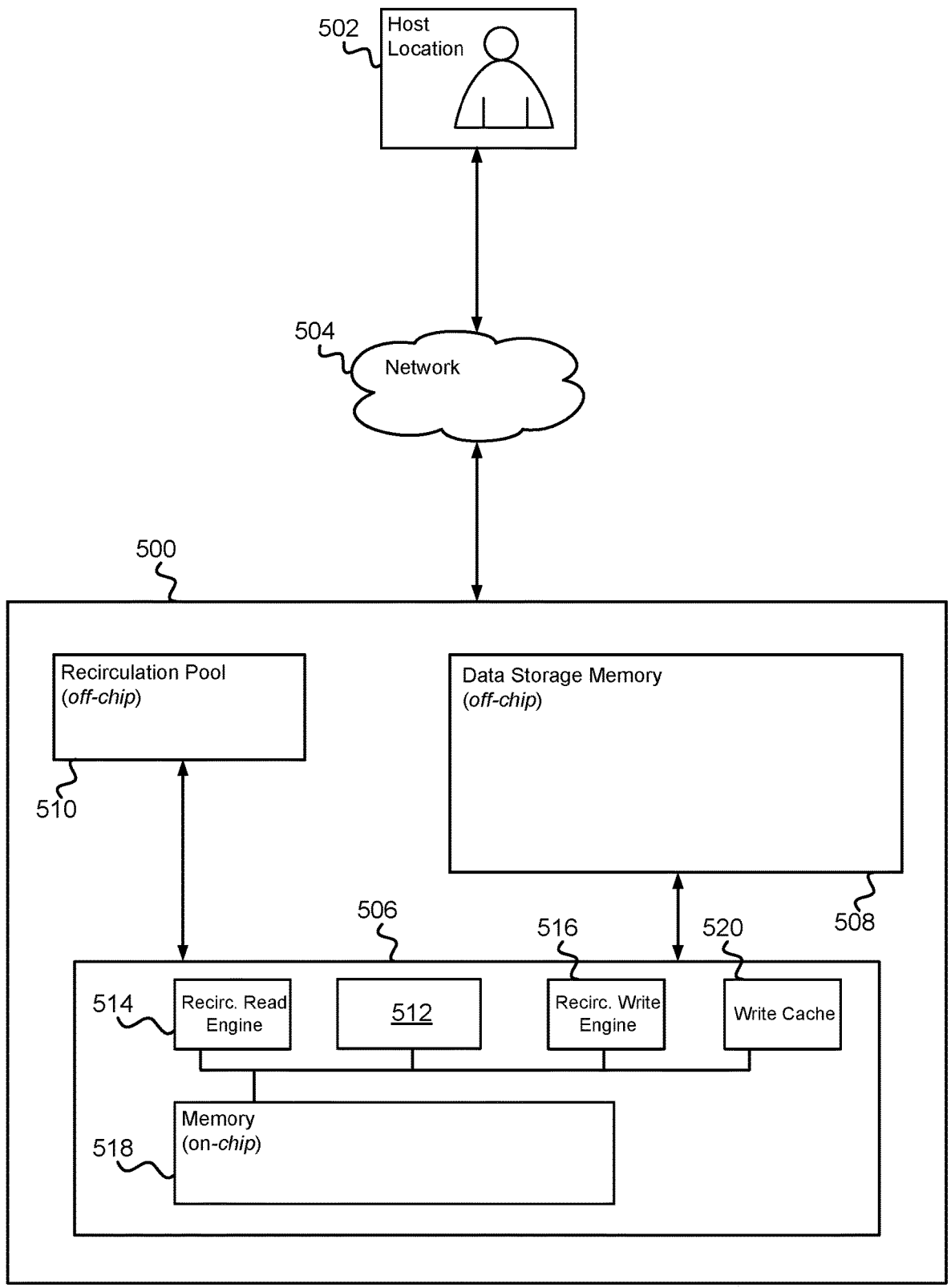
FIG. 5 is a partial representational view of a data storage system, in accordance with one embodiment.

Looking now to FIG. 5, a system 500 having various components is illustrated in accordance with one embodiment. As an option, the present system 500 may be implemented in conjunction with features from any other embodiment listed herein, such as those described with reference to the other FIGS., such as FIG. 3. However, such system 500 and others presented herein may be used in various applications and/or in permutations which may or may not be specifically described in the illustrative embodiments listed herein. According to an example, which is in no way intended to limit the invention, at least a portion of the system 500 may include and/or be implemented on an integrated circuit, e.g., such as a field-programmable gate array (FPGA). Further, the system 500 presented herein may be used in any desired environment. Thus FIG. 5 (and the other FIGS.) may be deemed to include any possible permutation.

Again, the system 500 includes various components therein and is also coupled to a host location 502 over a network 504. It follows that requests, data, information (e.g., metadata), commands, etc., may be sent between the system 500 and host location 502 over the network 504. However, it should be noted that the specific configuration depicted in FIG. 5 is in no way intended to be limiting. For instance, although only one host location 502 is illustrated as being connected to the data storage system 500, in other approaches any number of hosts, remote systems, networks, etc. may be connected thereto. It should also be noted that a host location may be of varying types and/or include varying components depending on the approach. For instance, in some approaches a host location may be a physical location where a user has access to a computing device that has access to the network 504. In other approaches, the host location may be a data storage system physically removed from system 500, a processor location where an application is being run, etc.

It should also be noted that network 504 may be of any type, e.g., depending on the desired approach. For instance, in some approaches the network 504 is a WAN, e.g., such as the Internet. However, an illustrative list of other network types which network 504 may implement includes, but is not limited to, a LAN, a PSTN, a SAN, an internal telephone network, etc. Accordingly, the data storage system 500 and the host 502 are able to communicate with each other regardless of the amount of separation which exists therebetween, e.g., despite being positioned at different geographical locations.

Looking to the system 500, an integrated circuit 506 is depicted as being connected to different memory locations. Specifically, the integrated circuit 506 is coupled to data storage memory 508 as well as a data recirculation pool 510. The data storage memory 508 may include any desired type of memory, e.g., depending on the desired approach. According to an example, the data storage memory 508 may include NAND Flash memory in some approaches.

It follows that the data storage memory 508 may be configured differently depending on desired functionality, the type of data storage system, industry standards, etc. The data recirculation pool 510 may also involve different types of memory depending on the particular approach. For instance, in some approaches the data recirculation pool 510 may be located in DRAM.

While the data storage memory 508 may be used to actually store data (e.g., when not in use) therein, it may also include components that are involved with the storage and access of data. For example, the data storage memory 508 may actually include a storage controller.

The integrated circuit 506 itself includes a controller 512 which is coupled to a number of different components. As shown, the controller 512 is coupled to a recirculation read engine module 514 as well as a recirculation write engine module 516. With respect to the present description, the "recirculation" of data intends to refer to the process of relocating valid data from memory before it is erased as a part of the garbage collection process. In other words, the recirculation of data is intended to refer to the relocation of valid data from memory that is undergoing garbage collection.

Accordingly, the recirculation read engine module 514 may be used in the process of identifying valid data in memory that is due for garbage collection, and actually retrieving the valid data from the memory. In a related role, the recirculation write engine module 516 may be used in the process of generating recirculation requests (e.g., commands) that, when satisfied, will result in valid data being recirculated to a different storage location in memory, thereby freeing the block in which it was previously stored for further use, e.g., as would be appreciated by one skilled in the art after reading the present description.

Integrated circuit 506 further includes memory 518 (e.g., on-chip memory) as well as a write cache 520, both of which are coupled to the controller 512 therein. The write cache 520 may be used to accumulate write requests that correspond to data stored in the system (e.g., in data storage memory 508) before being actually implemented. The write cache 520 may accumulate write requests received from the host 502 as well as recirculation write requests that result from the garbage collection of memory. It follows that depending on the particular approach, the source of a write request may have an effect on the order in which it is implemented. For example, host write requests may be given higher priority than recirculation write requests, as host write requests typically involve new data.

However, the process of satisfying recirculation write requests has a significant impact on memory throughput and efficiency. Again, conventional relocation processes themselves have been plagued by inefficiencies caused by invalid data and/or empty memory locations being processed for relocation in addition to the valid data. In sharp contrast to these conventional shortcomings, various ones of the approaches included herein have significantly improved both the efficiency and throughput of the garbage collection process, e.g., as will be described in further detail below.

Figure 6A:
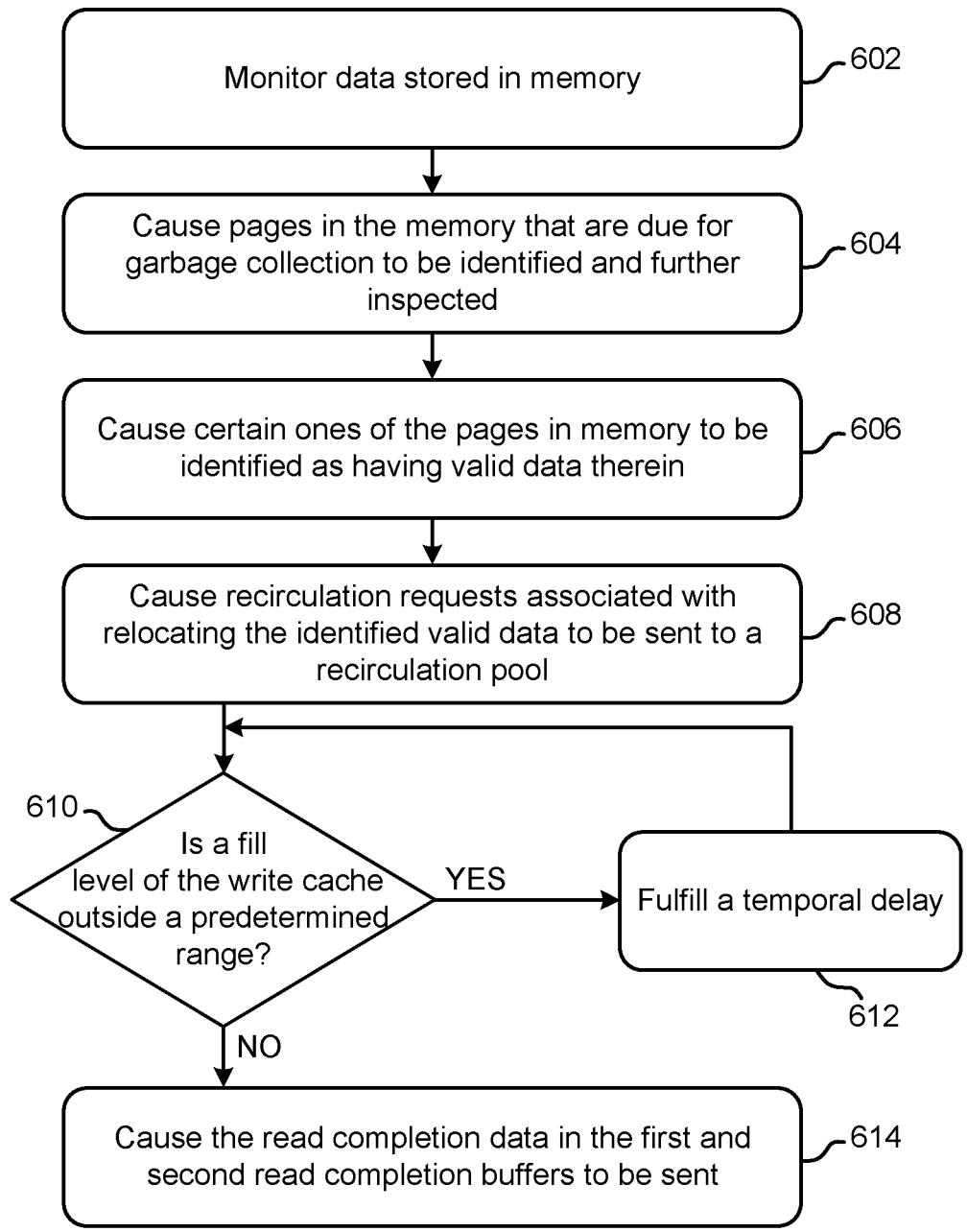
FIG. 6A is a flowchart of a method, in accordance with one embodiment.

Looking now to FIG. 6A, a method 600 for performing garbage collection on memory is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, a computer, etc., or some other device having one or more processors therein. According to examples, which are in no way intended to limit the invention, one or more of the processes included in method 600 may be performed by an on-chip controller (e.g., see controller 512 of FIG. 5). Thus, in some embodiments, method 600 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Referring now to operation 602, method 600 includes monitoring data stored in memory. As noted above, the general architecture of memory like NAND Flash involves memory locations being erased in sections prior to being written to. Before erasing though, a section undergoes garbage collection, whereby any valid data in the section is relocated to a new section. Garbage collection of a section is typically deferred for as long as possible to maximize the amount of invalidated data in the section, and thus reduce the number of valid pages that are relocated. However, it is hugely impractical to wait for an entire section of memory to be void of any valid data before erasing it to minimize write amplification stemming from valid data relocation writes.

Thus, by monitoring the memory (or at least causing the memory to be monitored), portions of memory which are prime candidates for garbage collection may be identified. Accordingly, operation 604 includes causing pages in the memory that are due for garbage collection to be identified and further inspected. In some approaches, memory is identified as a candidate for garbage collection in response to a predetermined condition having been met, e.g., such as experiencing a predetermined number of read operations, a predetermined amount of time having passed, a predetermined number of read and/or write errors being experienced, etc.

Again, the type of memory that is being evaluated for garbage collections may vary, but typically involves an architecture in which pages of memory include a number of planes therein. For instance, each of the pages of memory in FIG. 4 may include 4 separate planes therein, each of the planes being able to store a similar amount of data. While the number of planes included in the respective pages may vary depending on the particular approach, approaches herein are desirably able to inspect and access data in each of the identified pages on a plane level of granularity, which has been conventionally unachievable. In other words, approaches included herein have desirably improved the accuracy and granularity in which data can be recirculated as a part of the garbage collection process.

With continued reference to FIG. 6, method 600 additionally includes causing certain ones of the pages in memory to be identified as having valid data therein. See operation 606. Valid data may be identified in a number of different ways depending on the particular approach. For instance, in various approaches valid data may be identified by accessing a lookup table, actually inspecting the memory, searching for one or more flags, etc.

Depending on the given page, valid data may be stored in one, a few, most, all, etc., of the planes that are included in the given page. It follows that valid data may be positioned differently among the planes in different pages. While conventional implementations have been unable to control valid data on a plane level, various ones of the approaches included herein are able to successfully identify and process valid data on this much smaller scale. This significantly reduces the write overhead experienced by the system by decreasing the total number of unnecessary recirculation writes that are performed. It also desirably reduces the number of recirculation errors (e.g., mismatch errors) that are experienced as a result of attempting to relocate invalid data or empty memory locations altogether.

These improvements are achieved, at least in part, as a result of being able to selectively identify the specific planes that include valid data, and processes these identified planes while ignoring planes having invalid data or no data at all. Accordingly, operation 608 includes causing recirculation requests associated with relocating the identified valid data to be sent to a recirculation pool.

It should be noted that the recirculation requests that are sent to the recirculation pool only involve planes that include valid data. In other words, the recirculation requests do not include planes in the identified pages that do not include any of the valid data. This allows for the recirculation requests to only relocate the valid data from the respective planes while essentially ignoring planes having invalid data or no data at all stored therein. This significantly improves overall performance by not only decreasing the total number of recirculation writes that are performed and thereby the write congestion placed on the system as a whole, but also decreasing the number of errors that are experienced during the garbage collection process.

This selective recirculation of valid data is achieved at least in part as a result of being able to support data recirculation while differentiating at the plane level as opposed to the page level. Plane offset values may be used to actually achieve this greater level of differentiation by actually defining an initial plane to begin recirculation at, as well as an ending plane. The plane offset values may even be used to skip over certain planes in a given page that are identified as not including any valid data. Depending on the approach, the plane offset values may be stored in a lookup table, appended to the recirculation request itself (e.g., in a metadata header), using one or more flags, etc. As a result, the approaches herein are able to begin data recirculation at any desired plane, and end at any desired plane. Again, by reducing unnecessary planes from being processed for recirculation, the mismatches experienced are also reduced.

The recirculation pool thereby effectively serves as a queue that accumulates recirculation requests that are performed as a part of the garbage collection process. The recirculation pool may be located in different types of memory depending on the particular approach and configuration of the overarching system. For instance, in some approaches the recirculation pool may be located in off-chip memory, e.g., such as DRAM. This allows for the recirculation pool to be of an adequate size to accumulate whatever recirculation requests are experienced over a period of time. As a result, the pool is able to delay recirculation requests in situations where the write cache is undesirably full, host requests are given a higher priority, there is a surplus of available (erased) blocks in memory, etc. In some situations, a temporal delay may even be applied to recirculation requests sent from the recirculation pool to the write cache, e.g., as will be described in further detail below.

It follows that by sending recirculation requests to the recirculation pool (a dedicated memory location) as opposed to the write cache, the approaches herein are desirably able to avoid situations where recirculation requests are dropped as a result of the write cache being undesirably full. As a result, this significantly improves performance of the system by reducing the computational congestion that is placed on the system by having to repeat the recirculation request at a later time in order to relocate the valid data that was ignored. Additionally, by accumulating recirculation writes in the recirculation pool as opposed to recirculation read requests, the approaches herein are effectively able to reduce the latency experienced by the system as a whole. This is due, at least in part, to the fact that recirculation write requests may be sent directly to the write cache, while recirculation read requests are performed in order to retrieve the valid data used in the later recirculation write requests, e.g., as would be appreciated by one skilled in the art after reading the present description.

Proceeding now to decision 610, a determination is made in some approaches prior to sending recirculation requests from the recirculation pool to a write cache. Specifically, in some approaches a determination is made as to whether a fill level of the write cache is outside a predetermined range. In other words, decision 610 includes determining if the write cache is undesirably full.

The predetermined range may be set based on a size of the write cache, a construction of the write cache, user preferences, industry standards, performance capabilities of the write cache, past performance of the write cache, etc. It should also be noted that "outside a predetermined range" is in no way intended to limit the invention. Rather than determining whether a value is outside a predetermined range, equivalent determinations may be made, e.g., as to whether a value is within a predetermined range, whether a value is above a threshold, whether an absolute value is above a threshold, whether a value is below a threshold, etc., depending on the desired approach.

In response to determining that the fill level of the write cache is outside the predetermined range, method 600 proceeds from decision 610 to operation 612. There, operation 612 includes fulfilling a temporal delay before returning to decision 610 to determine again whether the fill level of the write cache is still outside the predetermined range. Depending on the approach, the temporal delay may be predetermined, based on the current fill level of the write cache, a current fill level of the recirculation pool, etc.

Returning to decision 610, in response to determining that the fill level of the write cache is in (or equivalently, not outside) the predetermined range, the flowchart proceeds to operation 614. There, operation 614 includes causing at least some of the recirculation requests in the recirculation pool to be sent to the write cache.

As noted above, the write cache may serve as a queue for requests before they are implemented in memory. Thus, in addition to the recirculation requests, other types of requests may be held in the write queue before being implemented in actual memory. For example, data operation requests may be received from a host (e.g., see 502 in FIG. 5), running applications, other storage systems, etc. It follows that the process of actually sending recirculation requests in the recirculation pool to the write cache may involve additional sub-processes in order to maintain the improved throughput and efficiency achieved by the approaches herein.

Figure 6B:
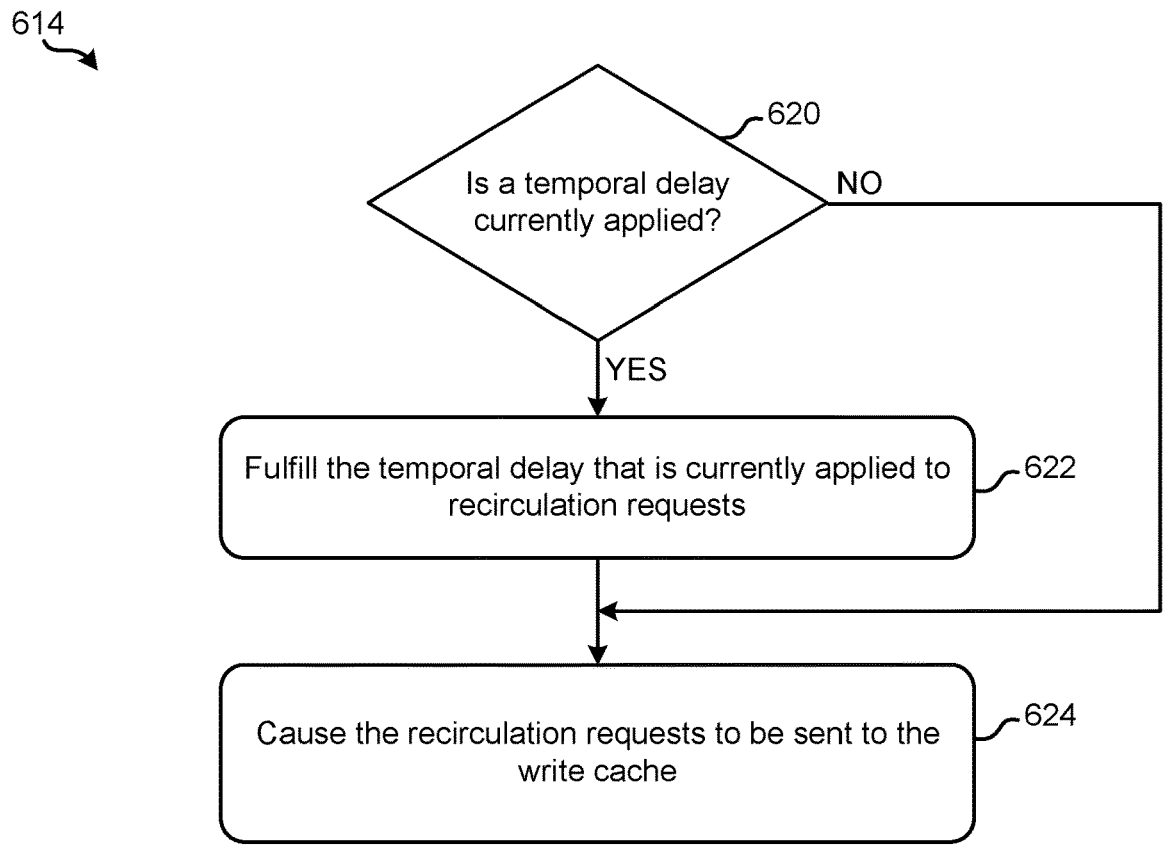
FIG. 6B is a flowchart of sub-processes for one of the operations in the method of FIG. 6A, in accordance with one embodiment.

For instance, looking now to FIG. 6B, exemplary sub-processes of causing at least some of the recirculation requests in the recirculation pool to be sent to the write cache are illustrated in accordance with one embodiment. Accordingly, one or more of the sub-processes may be used to perform operation 614 of FIG. 6A. However, it should be noted that the sub-processes of FIG. 6B are illustrated in accordance with one embodiment which is in no way intended to limit the invention.

As shown, a decision is made as to whether a temporal delay is currently applied to recirculation requests sent from the recirculation pool to the write cache (e.g., as opposed to other types of requests). See decision 620. However, it should be noted that the use of temporal delays are in no way intended to be limiting, and selective recirculation requests may be delayed from being sent to the write cache using any desired processes.

Again, the write cache may serve as a queue for different types of requests before they are implemented in memory. Thus, in addition to the recirculation requests, other types of requests may be held in the write queue before being implemented in actual memory. These different types of requests may have different performance characteristics associated therewith, different priority levels associated therewith, etc., and therefore it may be desirable to delay certain types of the requests in the write queue while promoting the performance of other types of requests. For example, host write requests may be given higher priority than recirculation write requests, as host write requests typically involve new data which is preferably implemented with less latency than recirculation writes.

It follows that the recirculation pool is preferably of an adequate size to accumulate whatever recirculation requests are experienced over a period of time. As a result, the pool is able to delay recirculation requests in situations where the write cache is undesirably full, host requests are given a higher priority, there is a surplus of available (erased) blocks in memory, etc. Moreover, by implementing the temporal delay between the recirculation pool and the write cache as opposed to before the valid data was actually read from the planes, latency of the system as a whole is significantly improved.

From decision 620, the flowchart proceeds to sub-operation 622 in response to determining that a temporal delay is currently applied to recirculation requests sent from the recirculation pool to the write cache. There, sub-operation 622 includes fulfilling the temporal delay that is currently applied to recirculation requests. In other words, sub-operation 622 includes actually waiting the amount of time specified in the temporal delay before proceeding to sub-operation 624 and actually causing the recirculation requests to be sent to the write cache. In other words, sub-operation 622 involves intentionally delaying the recirculation requests from being sent to the write cache. Moreover, returning momentarily to decision 620, it is noted that the flowchart proceeds directly to sub-operation 624 in response to determining that a temporal delay is not currently applied to recirculation requests that are sent from the recirculation pool to the write cache. As a result, the recirculation requests are sent directly to the write cache without experiencing any intentionally implemented delays.

This temporal delay is in no way intended to be limiting, and may be predetermined (e.g., by a user, based on past performance, a size of the write cache, etc.), set in real time (e.g., dynamically), adjusted periodically (e.g., based on past performance), etc. Moreover, this temporal delay may be applied using a central clock or any processes that would be apparent to one skilled in the art after reading the present description. As a result, the delay temporarily reduces congestion caused by the garbage collection process which may desirably allow for greater host request throughput for a period of time.

It should also be noted that the temporal delay that is applied to recirculation requests sent from the recirculation pool to the write cache may be between 0 and about 2 microseconds, but may be longer, e.g., depending on the desired approach. Moreover, the temporal delay may be managed by a timing scheme (e.g., a central clock) that operates in increments of less than 500 nanoseconds, e.g., 250 nanosecond increments, but the increments may be larger or smaller, again depending on the desired approach.

With respect to the process of sending recirculation requests to the pool, throughput is generally limited by the number of tags that are available to queue requests to be sent. For instance, various ones of the approaches herein include two different tags which may be used to queue requests to be sent to the recirculation pool. With respect to the present description, it should be noted that the use of the term "tag" is in no way intended to be limiting, but are preferably able to represent the bounds of a garbage collection cycle.

For instance, an even tag and an odd tag may be used in the process of recirculating valid data during garbage collection. An even tag may be used to represent a first plane having valid data to recirculate, and an odd tag may be used to represent a last plane having valid data to recirculate. The even tag and the odd tags are thereby able to define the bounds (e.g., start and end) of the planes that are to experience the garbage collection process. This may be achieved in some approaches by correlating even tags with even threads, and odd tags being correlated with odd thread. The tags may even be able to indicate certain ones of the planes between the odd and even tags that are to be skipped and not included in the garbage collection process for failing to include any valid data therein. Yet in other approaches, the recirculation requests may actually be assigned to a register, e.g., cycle start and/or cycle end registers.

It follows that by increasing the number of recirculation requests that may be assigned to a given tag for transfer to the recirculation pool, the approaches herein are desirably able to make a significant increase to the throughput of the garbage collection process. Moreover, because various ones of the approaches herein are able to selectively identify the planes that include valid data therein (e.g., as opposed to being limited to a page level granularity), the increase in throughput is combined with a significant improvement to efficiency.

Figure 6C:
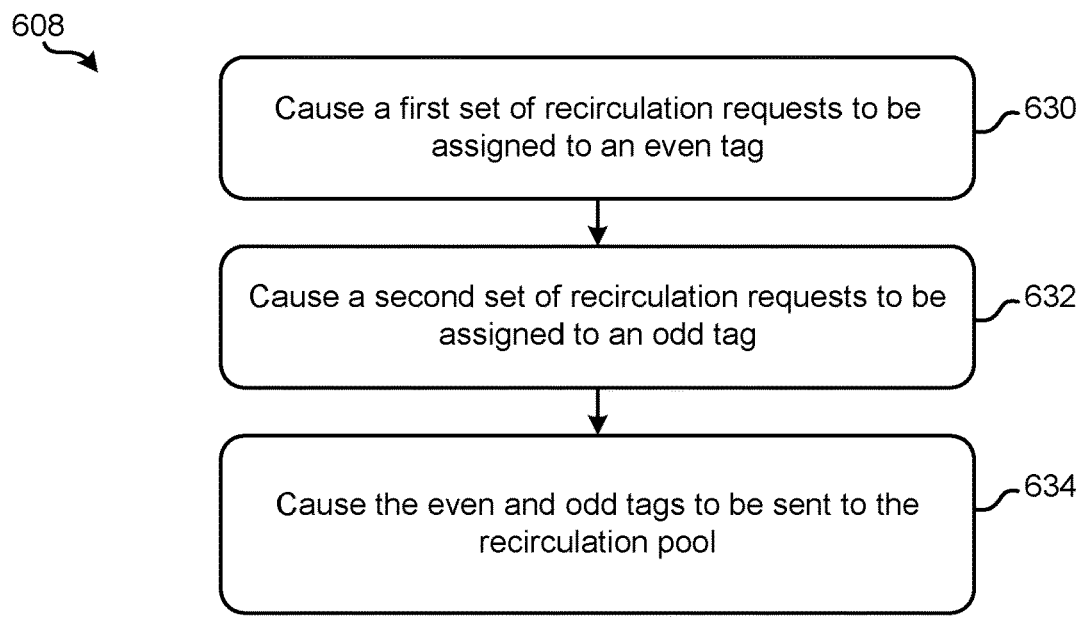
FIG. 6C is a flowchart of sub-processes for one of the operations in the method of FIG. 6A, in accordance with one embodiment.

For instance, looking now to FIG. 6C, exemplary sub-processes of causing recirculation requests to be sent to the recirculation pool are illustrated in accordance with one embodiment. Accordingly, one or more of the sub-processes may be used to perform operation 608 of FIG. 6A. However, it should be noted that the sub-processes of FIG. 6C are illustrated in accordance with one embodiment which is in no way intended to limit the invention.

As shown, sub-operation 630 includes causing a first set of recirculation requests to be assigned to an even tag, while sub-operation 632 includes causing a second set of recirculation requests to be assigned to an odd tag. As noted above, the process of assigning recirculation requests to even and odd tags may involve identifying a start and/or end plane associated with each of the recirculation requests in some approaches. This may be achieved in some approaches by actually identifying the physical address of a given plane and appending it to one of the tags. The even tag and the odd tags may thereby be able to define the bounds (e.g., start and end) of the planes that are to experience the garbage collection process. This may be achieved in some approaches by correlating even tags with even threads, and odd tags being correlated with odd thread.

It is also preferred that the first and second sets of recirculation requests each include a number "n" of more than one unique recirculation request. In other words, two or more unique recirculation requests are preferably assigned to the even tag, while two or more unique recirculation requests are assigned to the odd tag. While the number of requests that are assigned to each of the tags may vary, in some approaches each tag may have a total of 32 planes worth of data assigned thereto, e.g., to limit the amount of pressure that is placed on the recirculation pool. For instance, in preferred approaches, each of the tags may have between 2 and 6 unique recirculation requests assigned thereto, preferably 4 unique recirculation requests assigned to each of the tags. However, tags may have greater amounts of data assigned thereto, e.g., in high throughput periods.

The recirculation requests may be represented by identifying the first and last planes having valid data, as well as preferably identifying any planes between the first and last planes which do not include any valid data. It follows that in some approaches, a single recirculation request is represented by assigning a first plane of valid data to the even tag and a corresponding last plane of valid data to the odd tag. Accordingly, a number "n" of unique recirculation requests may be assigned to the even and odd tags similarly such that each of the "n" unique recirculation requests are represented by assigning a first plane of valid data to the even tag and a corresponding last plane of valid data to the odd tag. However, this is in no way intended to be limiting, and in other approaches the first and last planes of valid data may be assigned to the same tag.

After an adequate number of recirculation requests have been assigned to the tags, they are preferably sent to the recirculation pool. Thus, referring still to FIG. 6C, sub-operation 634 includes actually causing the even tag and the odd tag to be sent to the recirculation pool. The even and odd tags may be sent to the recirculation pool simultaneously and in parallel in some approaches, while in other approaches the two tags may each be sent individually (e.g., separated by some delay), partially in parallel, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 7:
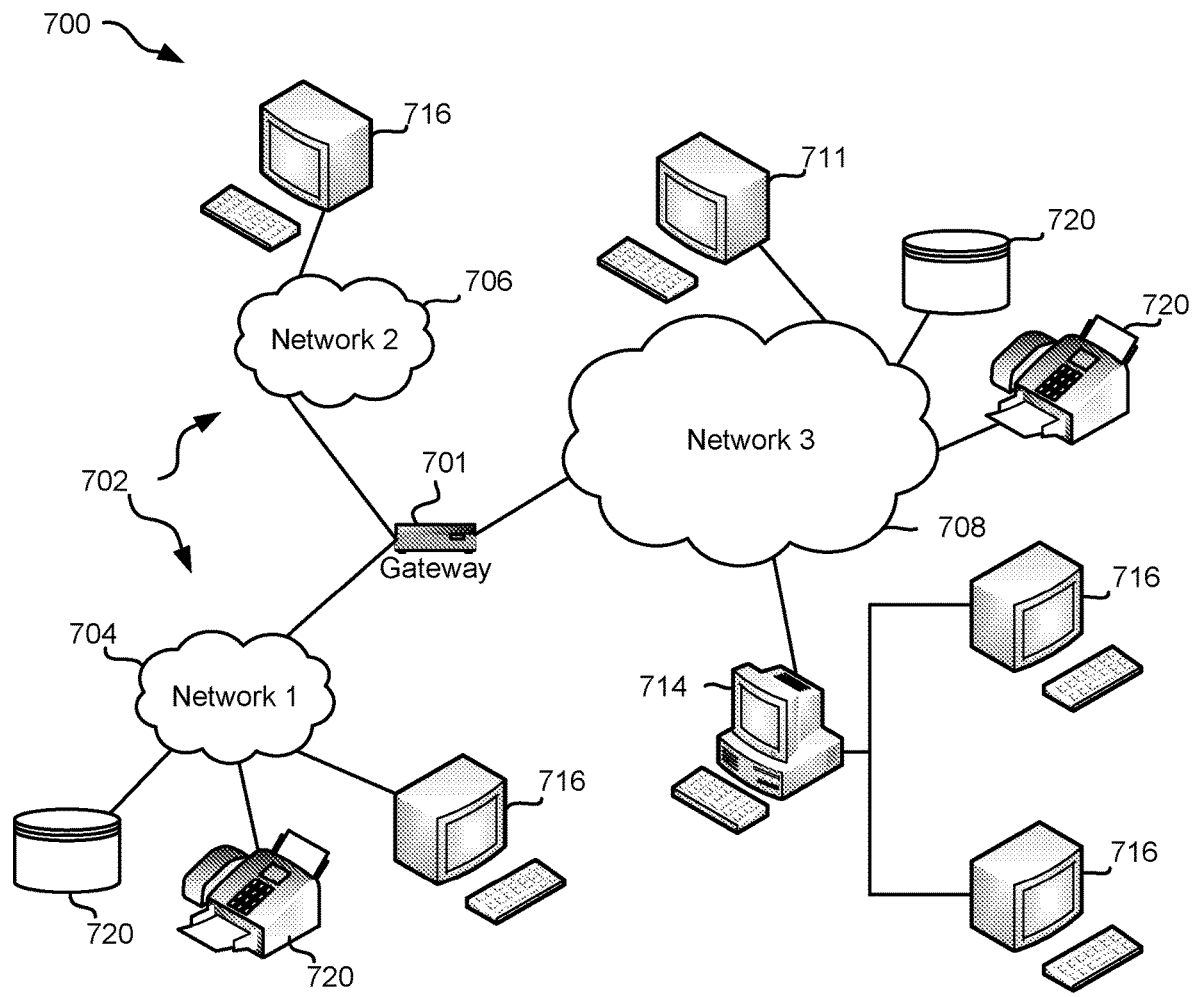
FIG. 7 is a network architecture, in accordance with one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, public switched telephone network (PSTN), internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, handheld computer, printer, and/or any other type of logic-containing device. It should be noted that a user device 711 may also be directly coupled to any of the networks, in some embodiments.

A peripheral 720 or series of peripherals 720, e.g., facsimile machines, printers, scanners, hard disk drives, networked and/or local data storage units or systems, etc., may be coupled to one or more of the networks 704, 706, 708. It should be noted that databases and/or additional components may be utilized with, or integrated into, any type of network element coupled to the networks 704, 706, 708. In the context of the present description, a network element may refer to any component of a network.

According to some embodiments, methods and systems described herein may be implemented with and/or on virtual systems and/or systems which emulate one or more other systems, such as a UNIX® system which virtually hosts an operating system environment, etc. This virtualization and/or emulation may be enhanced through the use of VMware® software, in some embodiments.

In other embodiments, one or more networks 704, 706, 708, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 8:
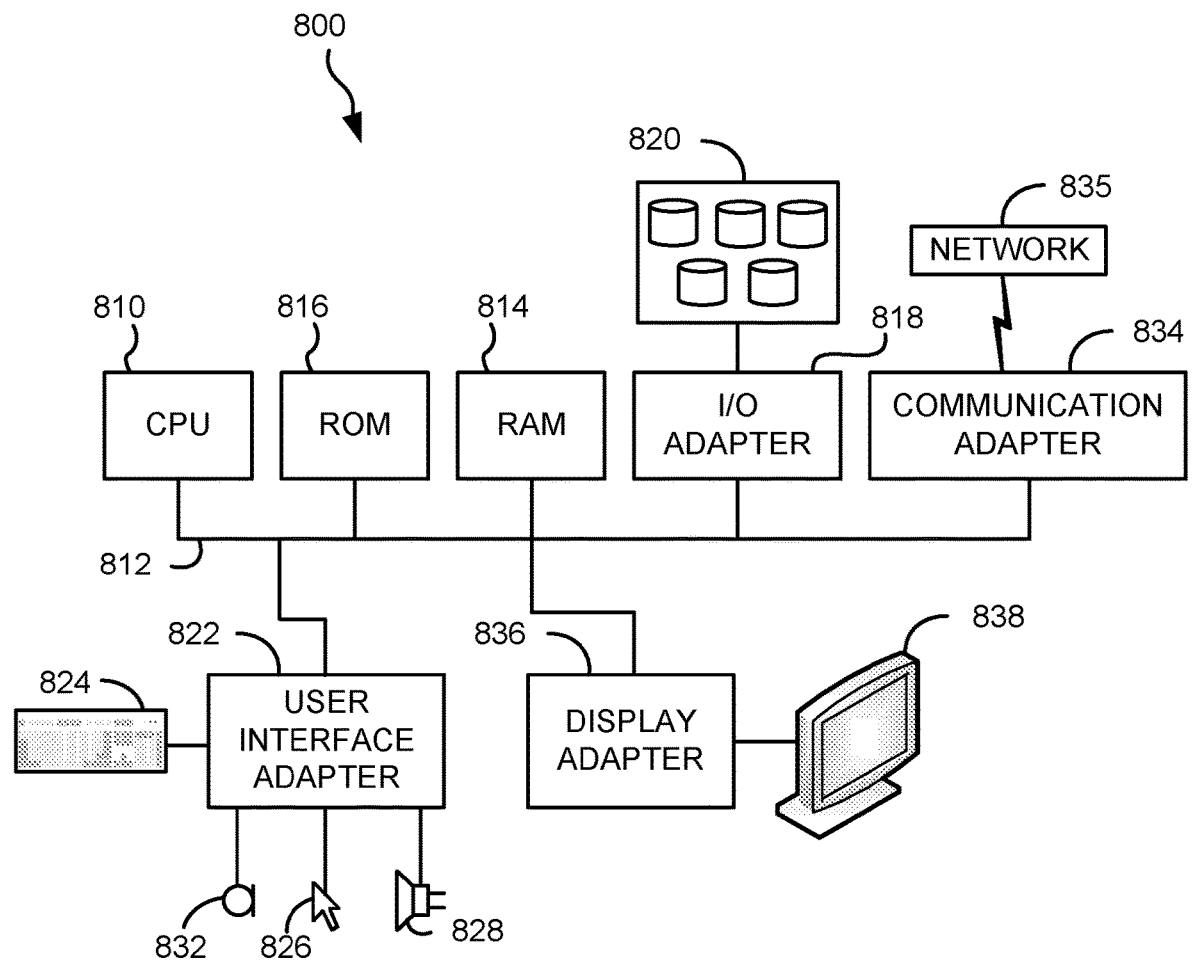
FIG. 8 is a representative hardware environment that may be associated with the servers and/or clients of FIG. 7, in accordance with one embodiment.

FIG. 8 shows a representative hardware environment associated with a user device 716 and/or server 714 of FIG. 7, in accordance with one embodiment. FIG. 8 illustrates a typical hardware configuration of a processor system 800 having a central processing unit 810, such as a microprocessor, and a number of other units interconnected via a system bus 812, according to one embodiment. In some embodiments, central processing unit 810 may include any of the approaches described above with reference to the one or more processors 210 of FIG. 2.

The processor system 800 shown in FIG. 8 includes a Random Access Memory (RAM) 814, Read Only Memory (ROM) 816, and an I/O adapter 818. According to some embodiments, which are in no way intended to limit the invention, I/O adapter 818 may include any of the approaches described above with reference to I/O adapter 218 of FIG. 2. Referring still to processor system 800 of FIG. 8, the aforementioned components 814, 816, 818 may be used for connecting peripheral devices such as storage subsystem 820 to the bus 812. In some embodiments, storage subsystem 820 may include a similar and/or the same configuration as data storage system 220 of FIG. 2. According to an example, which is in no way intended to limit the invention, storage subsystem 820 may include non-volatile data storage cards, e.g., having NVRAM memory cards, RAM, ROM, and/or some other known type of non-volatile memory, in addition to RAID controllers as illustrated in FIG. 2.

With continued reference to FIG. 8, a user interface adapter 822 for connecting a keyboard 824, a mouse 826, a speaker 828, a microphone 832, and/or other user interface devices such as a touch screen, a digital camera (not shown), etc., to the bus 812.

Processor system 800 further includes a communication adapter 834 which connects the processor system 800 to a communication network 835 (e.g., a data processing network) and a display adapter 836 which connects the bus 812 to a display device 838.

The processor system 800 may have resident thereon an operating system of any known type. It will be appreciated that a preferred embodiment may also be implemented on platforms and operating systems other than those mentioned. A preferred embodiment may be written using Java®, XML, C, and/or C++ language, or other programming languages, along with an object oriented programming methodology. Object oriented programming (OOP), which has become increasingly used to develop complex applications, may be used.

Figure 9:
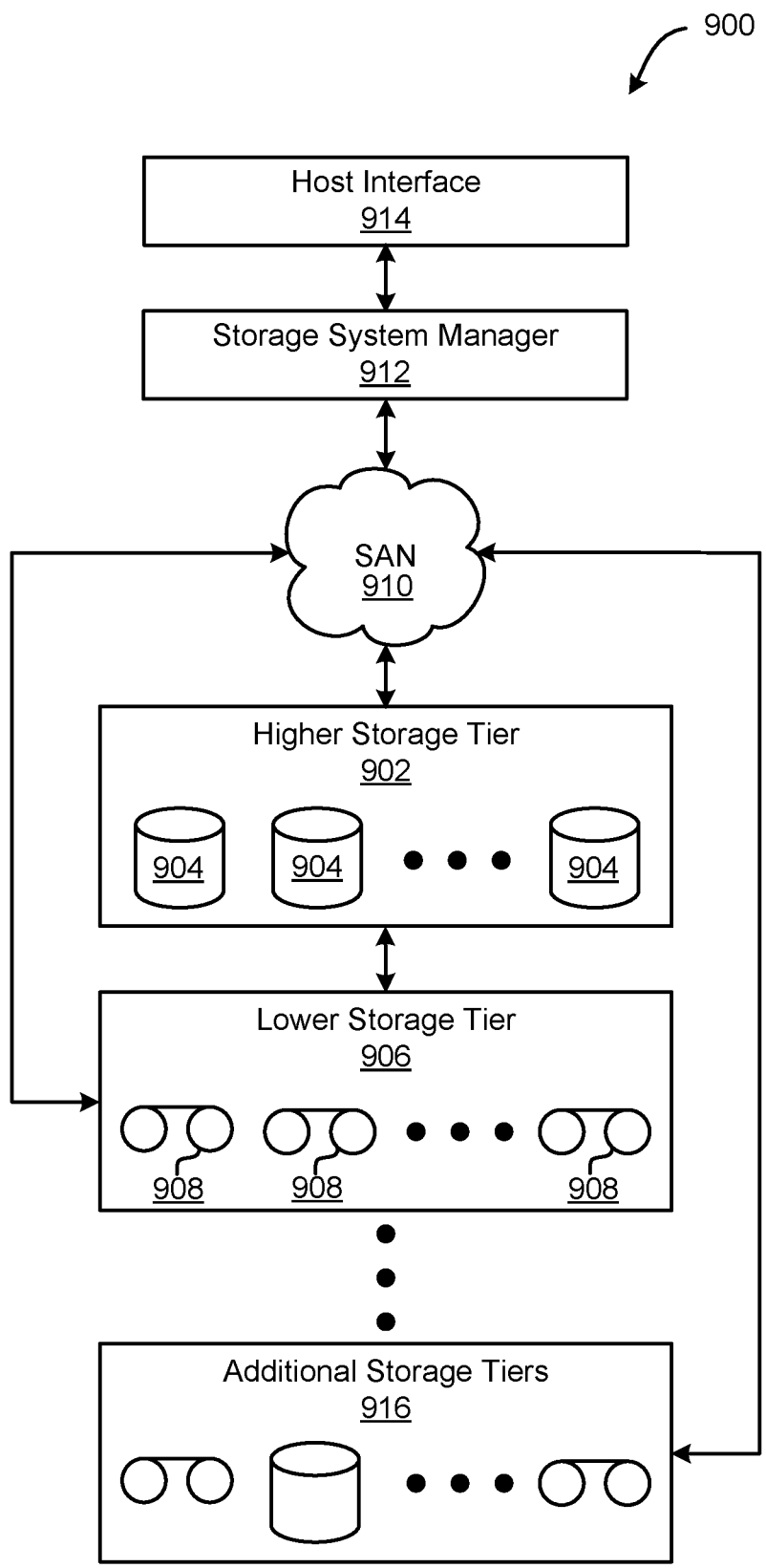
FIG. 9 is a diagram of a tiered data storage system in accordance with one embodiment.

Moreover, FIG. 9 illustrates a storage system 900 which implements high level (e.g., SSD) storage tiers in combination with lower level (e.g., magnetic tape) storage tiers, according to one embodiment. Note that some of the elements shown in FIG. 9 may be implemented as hardware and/or software, according to various embodiments. The storage system 900 may include a storage system manager 912 for communicating with a plurality of media on at least one higher storage tier 902 and at least one lower storage tier 906. However, in other approaches, a storage system manager 912 may communicate with a plurality of media on at least one higher storage tier 902, but no lower storage tier. The higher storage tier(s) 902 preferably may include one or more random access and/or direct access media 904, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 902 depending on the desired embodiment.

Referring still to FIG. 9, the lower storage tier(s) 906 preferably includes one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Thus, the one or more additional storage tiers 916 may, in some approaches, include a SSD system architecture similar or the same as those illustrated in FIGS. 1-2. Also, any of the higher storage tiers 902 and/or the lower storage tiers 906 may include any combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions.

Of course, this logic may be implemented as a method on any device and/or system or as a computer program product, according to various embodiments.

What is claimed is:

1. A computer-implemented method for performing garbage collection, comprising:
   causing pages in non-volatile memory that are due for garbage collection to be inspected, wherein the respective pages include multiple planes;

causing certain ones of the pages in the non-volatile memory having valid data therein to be identified, wherein the valid data is included in one or more of the planes in the respective identified pages;

causing recirculation requests to be sent to a recirculation pool by, for the respective recirculation requests:
- using a first tag to represent a first plane in a recirculation request having a first portion of the valid data to recirculate, and
- using a second tag to represent a last plane in the recirculation request having a last portion of the valid data to recirculate;

in response to determining that a fill level of a write cache is in a predetermined range, determining whether a temporal delay is currently applied to recirculation requests sent from the recirculation pool to the write cache; and in response to determining that a temporal delay is currently applied to recirculation requests sent from the recirculation pool to the write cache, causing one or more of the recirculation requests in the recirculation pool to be sent to the write cache in response to the temporal delay being fulfilled, wherein the recirculation requests selectively exclude planes in the identified pages that do not include any of the valid data.

2. The computer-implemented method of claim 1, wherein causing at least some of the recirculation requests in the recirculation pool to be sent to the write cache includes:
in response to determining that a temporal delay is not currently applied to recirculation requests sent from the recirculation pool to the write cache, causing the at least some recirculation requests to be sent immediately to the write cache.

3. The computer-implemented method of claim 1, wherein the temporal delay is between 0 and 2 microseconds, wherein the temporal delay is managed by a timing scheme that operates in increments of less than 500 nanoseconds.

4. The computer-implemented method of claim 1, wherein causing recirculation requests to be sent to the recirculation pool includes:
- causing a first set of the recirculation requests to be assigned to a third tag;
- causing a second set of the recirculation requests to be assigned to a fourth tag; and
- causing the third and fourth tags to be sent to the recirculation pool.

5. The computer-implemented method of claim 4, wherein the first set of recirculation requests includes a number n of unique recirculation requests, wherein the second set of recirculation requests includes n unique recirculation requests.

6. The computer-implemented method of claim 1, wherein the non-volatile memory is NAND Flash memory, wherein the recirculation pool is in dynamic random access memory (DRAM).

7. The computer-implemented method of claim 1, wherein the non-volatile memory includes block-stripes, wherein the respective block-stripes include multiple page-stripes therein, wherein the respective page-stripes include multiple pages therein, wherein the first tags are even tags and the second tags are odd tags.

8. A computer program product for performing garbage collection, the computer program product comprising:
a computer readable storage medium having program instructions embodied therewith, the program instructions readable by a processor, executable by the processor, or readable and executable by the processor, to cause the processor to:

cause pages in non-volatile memory that are due for garbage collection to be inspected, wherein the memory includes block-stripes, wherein the block-stripes include page-stripes, wherein the page-stripes include the pages, wherein the respective pages include multiple planes;

cause certain ones of the pages in the non-volatile memory having valid data therein to be identified, wherein the valid data is included in one or more of the planes in the respective identified pages;

cause recirculation requests to be sent to a recirculation pool by, for each the respective recirculation requests:
- using a first tag to represent a first plane in a recirculation request having a first portion of the valid data to recirculate, and
- using a second tag to represent a last plane in the recirculation request having a last portion of the valid data to recirculate;

in response to determining that a fill level of a write cache is in a predetermined range, determining whether a temporal delay is currently applied to recirculation requests sent from the recirculation pool to the write cache; and in response to determining that a temporal delay is currently applied to recirculation requests sent from the recirculation pool to the write cache, causing one or more of the recirculation requests in the recirculation pool to be sent to the write cache in response to the temporal delay being fulfilled, wherein the recirculation requests do not include planes in the identified pages that do not include any of the valid data.

9. The computer program product of claim 8, wherein causing at least some of the recirculation requests in the recirculation pool to be sent to the write cache includes:
- determining whether a temporal delay is currently applied to recirculation requests sent from the recirculation pool to the write cache; and
- in response to determining that a temporal delay is not currently applied to recirculation requests sent from the recirculation pool to the write cache, causing the at least some recirculation requests to be sent immediately to the write cache.

10. The computer program product of claim 8, wherein the temporal delay is between 0 and 2 microseconds, wherein the temporal delay is managed by a timing scheme that operates in increments of less than 500 nanoseconds.

11. The computer program product of claim 8, wherein causing recirculation requests to be sent to the recirculation pool includes:
- causing a first set of the recirculation requests to be assigned to a third tag;
- causing a second set of the recirculation requests to be assigned to a fourth tag; and
- causing the third and fourth tags to be sent to the recirculation pool.

12. The computer program product of claim 8, wherein the first tags are even tags and the second tags are odd tags.

13. The computer program product of claim 12, wherein the even and odd tags indicate certain ones of the planes between the first and last planes that do not include any of the valid data therein.

14. The computer program product of claim 8, wherein the recirculation pool is in dynamic random access memory (DRAM), wherein the non-volatile memory is NAND Flash memory.

15. A system, comprising:
- a plurality of non-volatile memory blocks arranged in block-stripes and configured to store data, the blocks having a plurality of page-stripes therein, wherein the page-stripes include a plurality of pages therein; and
- a processing circuit and logic integrated with and/or executable by the processing circuit, the logic being configured to:
  - cause pages in the non-volatile memory that are due for garbage collection to be inspected, wherein the respective pages include multiple planes;
  - cause certain ones of the pages in the non-volatile memory having valid data therein to be identified, wherein the valid data is included in one or more of the planes in the respective identified pages; and
  - cause recirculation requests to be sent to a recirculation pool by, for the respective recirculation requests:
    - using a first tag to represent a first plane in a recirculation request having a first portion of the valid data to recirculate, and
    - using a second tag to represent a last plane in the recirculation request having a last portion of the valid data to recirculate,
  - wherein the recirculation requests do not include planes in the identified pages that do not include any of the valid data,
  - wherein the non-volatile memory includes block-stripes,
  - wherein the respective block-stripes include multiple page-stripes therein,
  - wherein the respective page-stripes include multiple pages therein.

16. The system of claim 15, wherein the logic is configured to:
- in response to identifying the certain ones of the pages in the non-volatile memory as having valid data therein, causing the recirculation requests to be sent to a recirculation pool by:
  - causing a first set of the recirculation requests to be assigned to a third tag;
  - causing a second set of the recirculation requests to be assigned to a fourth tag; and
  - causing the third and fourth tags to be sent to the recirculation pool.

17. The system of claim 16, wherein the first set of recirculation requests includes a number n of unique recirculation requests, wherein the second set of recirculation requests includes n unique recirculation requests.

18. The system of claim 15, wherein the logic is configured to:
- in response to determining that a temporal delay is currently applied to recirculation requests sent to a write cache, cause recirculation requests to be sent to the write cache in response to the temporal delay being fulfilled, by:
  - determining whether a fill level of the write cache is outside a predetermined range; and
  - in response to determining that the fill level of the write cache is in the predetermined range, causing at least some recirculation requests held in a recirculation pool to be sent to the write cache.

* * * * *